(12) United States Patent
Kang

(10) Patent No.: US 6,397,043 B1
(45) Date of Patent: May 28, 2002

(54) METHOD FOR CONTROLLING FORWARD LINK POWER INDEPENDENT OF REVERSE LINK POWER CONTROL

(75) Inventor: Mi-jung Kang, Seoul (KR)

(73) Assignee: Samsung Electronics, Co., Ltd. (KR)

( * ) Notice: Subject to any disclaimer, the term of this patent is extended or adjusted under 35 U.S.C. 154(b) by 0 days.

(21) Appl. No.: 09/317,061

(22) Filed: May 24, 1999

(30) Foreign Application Priority Data

May 25, 1998 (KR) ............................................. 98-18790

(51) Int. Cl.[7] ................................................. H04Q 7/20
(52) U.S. Cl. ......................................... 455/69; 455/522
(58) Field of Search ........................ 455/69, 423, 13.4, 455/513, 522, 62, 67.1, 68, 571, 574, 452, 453; 370/311, 335, 342, 332, 333, 506; 375/224, 227, 228, 213, 285

(56) References Cited

U.S. PATENT DOCUMENTS

| | | | | |
|---|---|---|---|---|
| 5,778,030 A | * | 7/1998 | Bruckert et al. | 375/317 |
| 5,896,411 A | * | 4/1999 | Ali et al. | 375/200 |
| 6,058,107 A | * | 5/2000 | Love et al. | 370/332 |
| 6,075,974 A | * | 6/2000 | Saints et al. | 455/69 |
| 6,144,841 A | * | 11/2000 | Feeney | 455/69 |
| 6,148,208 A | * | 11/2000 | Love | 455/442 |
| 6,157,668 A | * | 12/2000 | Gilhousen et al. | 375/130 |
| 6,160,999 A | * | 12/2000 | Chheda et al. | 455/69 |
| 6,181,738 B1 | * | 1/2001 | Chheda et al. | 375/224 |
| 6,259,927 B1 | * | 7/2001 | Butovitsch et al. | 455/522 |
| 6,263,207 B1 | * | 7/2001 | Kito | 455/453 |

* cited by examiner

Primary Examiner—Nay Maung
Assistant Examiner—Jean A Gelin
(74) Attorney, Agent, or Firm—Dilworth & Barrese, LLP

(57) ABSTRACT

A method for controlling the forward link power independent of reverse link power control is described. In a mobile communication system where the reverse link is degraded thereby preventing the forward link status to be sent to the base station, the base station estimates the forward link power using power control information received via the reverse link prior to the reverse link being degraded. The forward link is improved using the power control information and once improved the reverse link is improved via the improved forward link.

11 Claims, 8 Drawing Sheets

FIG. 7

| FORWARD LINK STATUS | REVERSE LINK STATUS | RECEIVABLE INFORMATION |
|---|---|---|
| GOOD | GOOD | EIB, PMRM, REVERSE ERASURE, LAYER 2 ACK (NORMAL) |
| GOOD | NOT GOOD | REVERSE ERASURE, LAYER 2 ACK (RETRY) |
| NOT GOOD | GOOD | EIB, PMRM, REVERSE ERASURE, LAYER 2 ACK (RETRY) |
| NOT GOOD | NOT GOOD | REVERSE ERASURE, LAYER 2 ACK |

METHOD FOR CONTROLLING FORWARD LINK POWER INDEPENDENT OF REVERSE LINK POWER CONTROL

FIELD OF THE INVENTION

The present invention relates to wireless communication systems. More particularly, the present invention relates to a method for controlling the forward link power independent of reverse link power control.

DESCRIPTION OF THE RELATED ART

In a code division multiple access (CDMA) cellular system, a plurality of mobile stations use the same frequency simultaneously. As such, the signal power of a mobile station has a significant influence on the signal power of other mobile stations.

FIG. 1 illustrates the receive sensitivity of a mobile station as a function of distance between a base transceiver station (BTS) and the mobile station when the BTS transmits at a constant signal strength. In FIG. 1, "A" represents a mean path loss, which is determined by the geographical model as well as the distance between the BTS and the mobile station.

It is well recognized by those skilled in the art that the path loss is proportional to the square of distance between the BTS and the mobile station and the variance of the path loss is 8 dB. Also, when a cell radius of 9 Km is assumed, the dynamic range of the path loss is on the order of 80 dB. Further, the mean path loss is constant regardless of link direction and typically has a log-normal distribution.

In FIG. 1, "B" represents the strength of the receive signal, which varies according to a Rayleigh Fading distribution, the variation occurs on both the forward link and reverse link, independent of the path loss.

Because the Rayleigh Fading distribution is independent of path loss, some other means of compensation is required for the variation in received signal strength (i.e., B) than what is used to offset path loss. In light of the above, the object of power control is to make the mean power level received in a BTS equal to "C" where "C" is a standard mean power level required for power control.

To meet the standard mean power level, the power control method employed to combat path loss can be divided into an open loop power control method, a closed loop power control method and an external loop power control method. The external loop power control method is required to perform power control in combination with those power control methods so that the mean receive power level is equal to "C".

If the forward or reverse link status is bad (i.e., the power level has fallen to an unacceptable level), a part of the frame being transmitted through each of the links is susceptible to being erased. In the case where an erasure frame, i.e., a bad frame, occurs on the forward link, the mobile station informs the BTS that the erasure frame has occurred indicating that the forward link is bad. The mobile station then sets the erasure indicator bit (EIB) to "1" and transmits the bit to the BTS. This is the process by which the MS informs the BTS that the forward link is bad.

FIG. 2 illustrates the situation where the EIB is set when an erasure frame occurs. As illustrated in FIG. 2, the mobile station 200 and BTS 250 exchange frames of 20 ms duration. The EIB is set and transmitted at an (i+1)th time when an erasure frame occurs in the mobile station 200 at an ith time. Considering a frame delay of 40 to 60 ms which typically occur in a radio wave environment between the mobile station 200 and BTS 250, the EIB arrives at the BTS 250 at the (i+3) time 230 so that the BTS will start power control after the (i+5)th time. Power control does not start until the (i+5)th time in consideration of the time required to analyze the received erasure indicator bit.

Given that the mobile station 200 has transmitted the EIB at the (i+1)th time if the receive sensitivity (i.e., link) of the mobile station should become good at the (i+4)th time, the transmit power level of the BTS cannot be corrected (i.e., increased) until the (i+5)th time due to frame delay. As such, the link remains unadjusted in the intervening time intervals.

That is, a problem occurs in that it takes as many as 5 to 6 frames from the time at which the BTS received the EIB until the BTS increases the power level.

Further, since it is not possible for the mobile station to normally receive a reverse power control bit during the 5 to 6 frames, the quality of the reverse link cannot be guaranteed.

In the case of the conventional method for controlling transmit power, which adjusts the transmit power level of the BTS in accordance with a received message, such as an EIB as described above, the adjusted transmit output of the BTS is not processed in real-time on the basis of a receive frame of the mobile station. That is, there is some lag time between requests of the mobile station and the processing of those requests by the BTS.

In the case where the receive sensitivity of the mobile station becomes good in the intervening time interval between the request and the subsequent power adjustment, the resulting power adjustment is unnecessary and wasteful. Additionally, in the case where the receive sensitivity of the mobile station becomes good for a longer duration, it will inevitably become bad again due to the lag effect. That is, there is a problem in that the BTS can not know the quality of forward link during the time from that the BTS starts to decrease the transmit power to that the mobile station reports the quality of forward link, so the BTS continues to decrease the transmit power even though the quality of forward link becomes worse during the intervening time.

Another conventional method for determining the forward link status, is by using a PMRM (Power Measurement report Message). The mobile station sends a PMRM message to the BTS whenever the quality of the forward link becomes worse. The PMRM includes the number of bad frames received via the forward link.

According, to this method, the mobile station measures the forward frame error rate (FFER) from the frames received via the forward traffic link between the mobile station and the synchronized BTS. If the FFER exceeds a predetermined threshold, the mobile station reports the number of bad frames received via the forward link to the BTS by way of the PMRM.

The PMRM also includes the FFER of the serving BTS measured by the mobile station. Therefore, the BTS can know the transmit power level received by the mobile station as determined from the strength of the pilot signal and frame error rate included in the PMRM.

However in a situation similar to that described above, when the reverse link status is not good, there is no way to control the transmit power level of a BTS, because the control information (i.e., EIB, PMRM) is not sent to the BTS.

If the status of the forward link is not good, the mobile station can not know that an erasure frame has occurred in the reverse link. So, the mobile station can not receive a power control bit, even though the BTS sends the power control bit to direct the mobile station to increase the transmit power as a consequence of receiving the reverse erasure frame. Therefore, if the status of forward link is not good, the status of the reverse link also becomes bad as a result of not being able to receive the reverse power control bit.

That is, if the reverse link is good and forward link is not good, the mobile station can not receive the reverse power control bit from the BTS. Then, the mobile station can not perform reverse power control, accordingly, the reverse link becomes bad. If some bad frames that are more than a predetermined number are received in the BTS as the reverse link is not good, the BTS releases the call.

On the other hand, if the forward reverse link is good and reverse link is not good, the BTS can not receive the information of forward power, i.e., EIB and PMRM. Then, the BTS can not perform the forward power control, consequently, the forward link becomes not good. If some bad frames that are more than a predetermined number are received in the mobile station as the forward link is not good, the mobile station releases the call.

SUMMARY OF THE INVENTION

The present invention is a novel method for controlling the forward link power independent of the reverse link power control. The present invention makes it possible for the BTS to control forward link power even though information about the forward link status is not being received by the BTS because the reverse link status is degraded. The method further prevents the BTS from transmitting at an excessive power level in such a situation. Additionally, power control of the forward link is performed independently of the reverse link status, consequently it prevents the reverse link status from becoming more degraded.

According to one embodiment of the present invention, in the case where the reverse link status is not good and, as a consequence, the forward link status is not sent to the BTS, a preferred embodiment of the present invention of the method for controlling forward link power independent of reverse link power control includes the steps of: the BTS making an estimate of the forward link status using power control information, wherein the power control information is received via the reverse link prior to the reverse link status going bad; determining optimal power control information in accordance with a predefined threshold value by repeatedly estimating (i.e., making multiple measurements) the forward link status; improving the forward link status by determining a transmit power of the BTS as a function of the determined optimal power control information; and improving the reverse link status via the improved forward link.

According to another embodiment of the present invention, in the case where both the forward link and reverse link become bad simultaneously, a method for controlling forward link power independent of reverse link power control includes the steps of: improving the forward link status; sending the power control bit of the reverse link to a mobile station via the improved forward link; gradually improving the reverse link status by the mobile station using the power control bit of the reverse link; sending the forward link information to the BTS via the improved reverse link; and controlling the forward link power using the forward link information received via the improved reverse link.

According to another embodiment of the present invention, a method for controlling forward link power independent of reverse link power control includes the steps of: measuring by a mobile station, the pilot signal strength which is received from a BTS, and repeatedly reporting the measured strength and forward frame error rate through the PMRM message to the BTS; transmitting a message to the mobile station on Layer 2 if acknowledgment for the message is not received from the mobile station during a pre-specified time interval since the BTS has re-transmitted the message via the forward link to the mobile station; confirming by mobile station where an erasure frame occurs on the forward link and transmitting an EIB bit via the reverse link to the BTS if the erasure frame occurs on the forward link: confirming by the BTS whether the erasure frame has occurred on the reverse link after the BTS receives at least one PMRM and the EIB from the mobile station; performing power control of the forward link by the BTS using PMRMs and ACK History if the erasure frame has occurred on the reverse link as a result of the confirming step, wherein the PMRMs are received from the mobile station before the erasure frame has occurred and the ACK History occurs in Layer 2 of the mobile station and the BTS; and performing power control of the forward link by the BTS using the EIB received from the mobile station if the erasure frame has not occurred on the reverse link as a result of the confirming step.

BRIEF DESCRIPTION OF THE DRAWINGS

FIG. 7 shows a table illustrating forward link information to be received according to the forward link status and reverse link status.

DESCRIPTION OF THE PREFERRED EMBODIMENTS

The forward link and reverse links of a CDMA system are closely related to each other. If the quality of either link is not good, it may adversely influence the other link.

Figure 1:
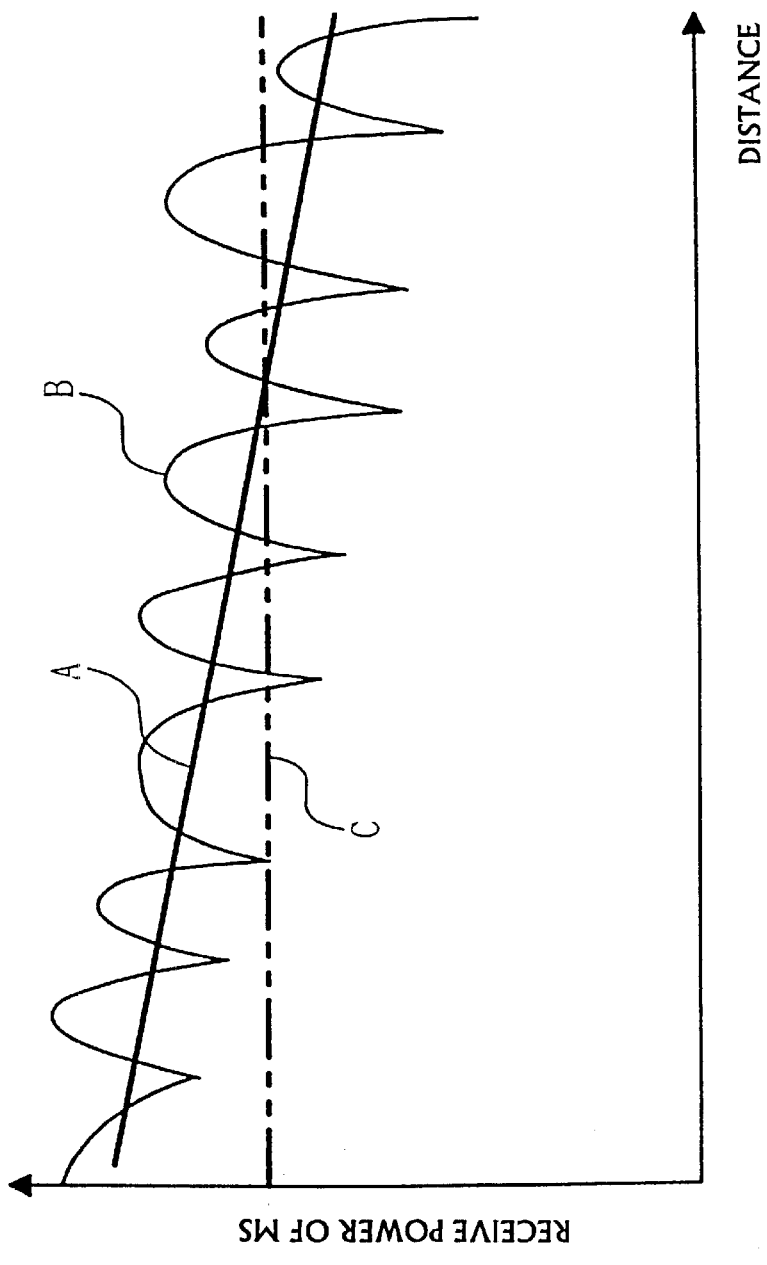
FIG. 1 illustrates the receive sensitivity of mobile station according to variation of distance between BTS and mobile station in connection with signal received in the mobile station when the BTS transmits signal at a constant strength.
Figure 2:
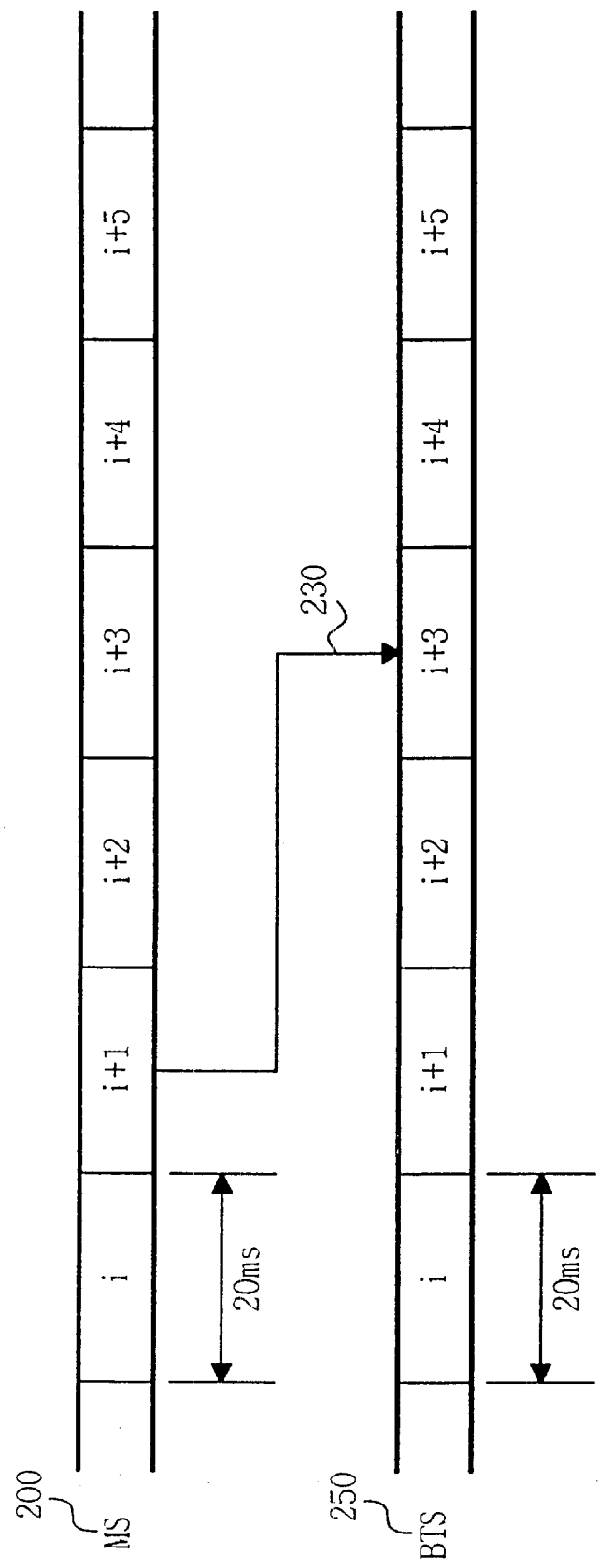
FIG. 2 illustrates the time when EIB is set in case that erasure frame occurs.
Figure 3:
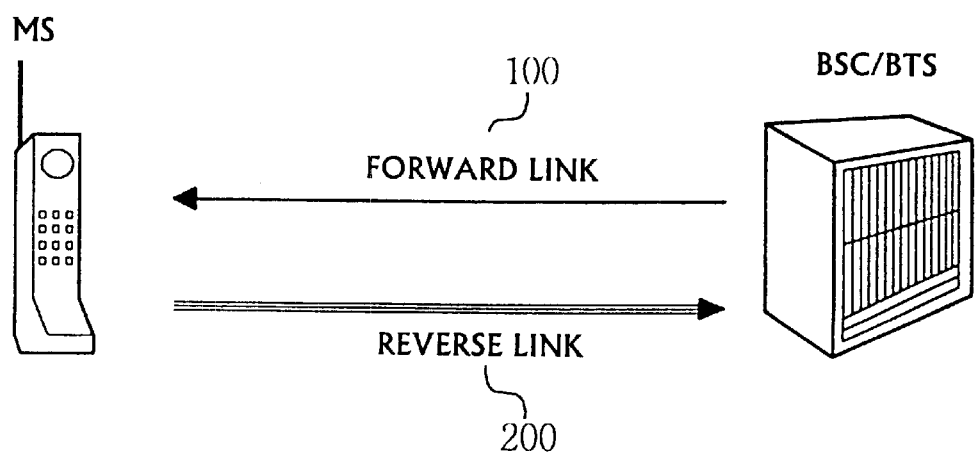
FIG. 3 illustrates forward link and reverse link.
Figure 4:
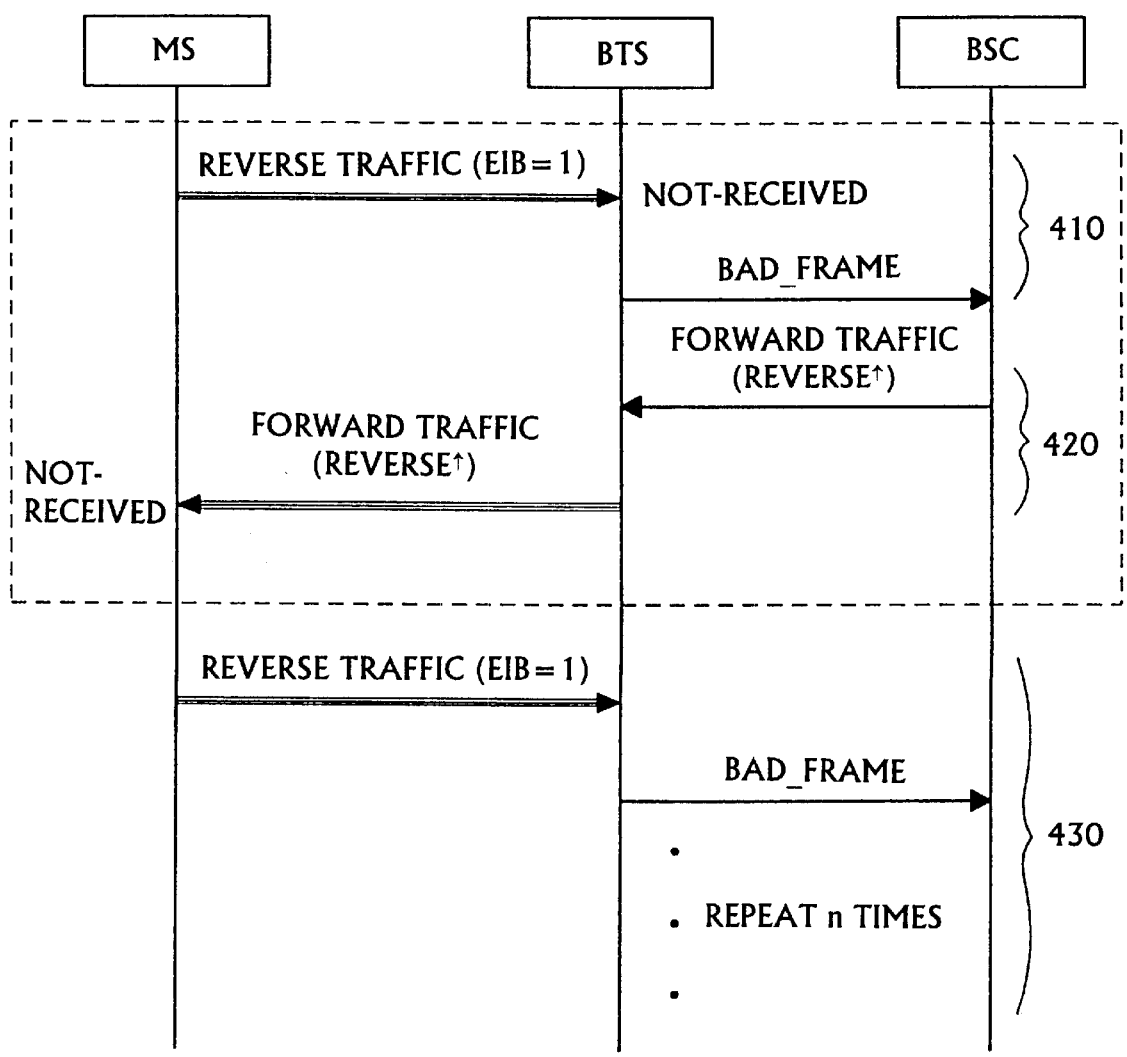
FIG. 4 illustrates conventional method in case that all of forward and reverse links are not good.

Referring to FIG. 4, in step 410, the MS transmits a reverse traffic frame to the BTS including EIB set to 1. Because the reverse link is bad, the BTS cannot properly receive the reverse traffic frame. That is, the BTS receives, instead, a bad frame having errors and reports the bad frame to the BSC. In step 420, upon receiving the bad frame from the BTS, the BSC determines that the reverse link is faulty and transmits a forward traffic frame, including a reverse power control bit to the MS via the BTS. However, if the forward link is also faulty, the forward traffic frame cannot be properly received by the MS, consequently the reverse link cannot be recovered. Step 430 is provided to indicate that steps 410 and 420 are repeated over and over thereby overloading the MS, BTS, and BSC due to the repetitive messaging associated with steps 410 and 420.

FIG. 4 illustrates two cases, a first case where the reverse link status is bad, and as a consequence, the BTS receives reverse frames from the mobile station via a TCE (Traffic Channel Element), as erasure frames (i.e., BAD_FRAME 410). A second case where the forward link status becomes bad. When this occurs, a mobile station (MS) does not receive the reverse power control bit via the forward link 420. As a result, a call will be released when the mobile station or the BTS continuously receives erasure frames (i.e., BAD_FRAME 430).

In a cellular system, a base station controller (BSC), which controls a plurality of BTSs, controls the power of each BTS using the transcoder and selection bank (TSB). That is, the TSB of the BSC manages the forward power control of each of the plurality of BTSs.

The TSB of a BSC determines both the transmit power and the forward link status of the BTS from either the erasure indicator bit (EIB) or the PMRM of the reverse traffic frame uploaded from the mobile station.

However, the EIB needs to be evaluated over a duration of approximately five frames to determine transmit power and forward link status whereas the PMRM informs the BTS only if some error frames, i.e., BAD_FRAMEs are received, where the number of error frames is predetermined.

In addition to the above, additional methods for confirming the receive sensitivity (i.e., quality of the received signal) of the mobile station by the BTS include using Layer 2 Acknowledgment (ACK) history.

The Layer 2 ACK history is a method of using the ACK-SEQ (1 bit) being exchanged on Layer 2, the data link layer, between the BTS and mobile station. Generally, the acknowledgment is included in a signaling message on the forward and reverse traffic channels. If an abnormal message is received, the BTS and mobile station either does not respond with an ACK or responds by issuing a NACK.

If ACK is not received or NACK is received, the BTS or mobile station re-transmits the corresponding message.

The above two cases, (i.e., using the EIB and using Layer 2 ACK history) can provide an additional decision basis for real time power control, however, they are insufficient to determine power control by themselves. This is because the Layer 2 ACK history can not confirm whether the mobile station receives transmit frames of the BTS, or whether the BTS does not receive transmit frames of the mobile station, even though messages are transmitted between the mobile station and the BTS. That is, the Layer 2 ACK history provides only the composite quality about the forward and reverse links and does not inform which link has a problem.

However, in case where the EIB or PMRM message does not arrive at the BTS because the reverse link status is not good, the Layer 2 ACK history or reverse erasure frame can be useful information for determining the status of the forward link. This is true because the BTS already knows that the reverse link status is not good. That is, by receiving an EIB set to 1 it is a certainty that there is a need to increase the transmit power level of the BTS, and additionally receiving the reverse erasure frame means the transmit power level of the mobile station is not good.

The present invention provides a method to quickly respond to the demand for receive power of the mobile station based on four kinds of information, i.e., EIB, PMRM, Layer 2 ACK history and reverse erasure frame.

The present invention is applicable into two cases, a first case where the reverse link is good between the mobile station and BTS, and a second case where the reverse link is not good. In both cases, the BTS can not determine whether the forward link status is good or bad due to a faulty reverse link.

In the first case where the reverse link is good, the BSC can perform power control because it is possible to normally receive the EIB or the PMRM message on the reverse link. However, when the reverse link is not good, it is not possible for the BTS to know the forward link status because EIB or PMRM is not received in the BTS. In the second case, the BSC needs to estimate the forward link status using the reverse erasure frame and Layer 2 ACK history to perform power control as well as some additional input parameters.

The additional input parameters include, determining whether reverse erasure frames are continuously received, whether re-transmission is continuously performed as an ACK is not received for the recent Layer 2 ACK history, and the value of pilot strength of the recently received PMRM.

To perform power control in accordance with the second method, it is necessary to find optimal values for each of the three aforementioned input parameters through repeated testing. That is, the additional input parameters described above will be continually checked (i.e., repeatedly tested) to determine optimal values. More particularly, repeated testing describes a step of measuring whether reverse erasure frames are continuously received in the most recent time interval (the time interval being of some pre-determined duration), and determining whether to re-transmit the Layer 2 ACK and the pilot strength of PMRM. The testing procedure is described below.

Estimating Forward Link Status Via Reverse Erasure Frames

A method for estimating the forward link status using the reverse erasure frame will now be explained.

When the BSC receives a reverse erasure frame, the BSC confirms whether the PMRM message which includes the forward error rate count is higher than a specified level of the reverse erasure frame in the PMRM previously received, and if a forward error is higher than a specified level then the forward transmit power is increased, otherwise the present power control status of the BTS is maintained.

Figure 5:
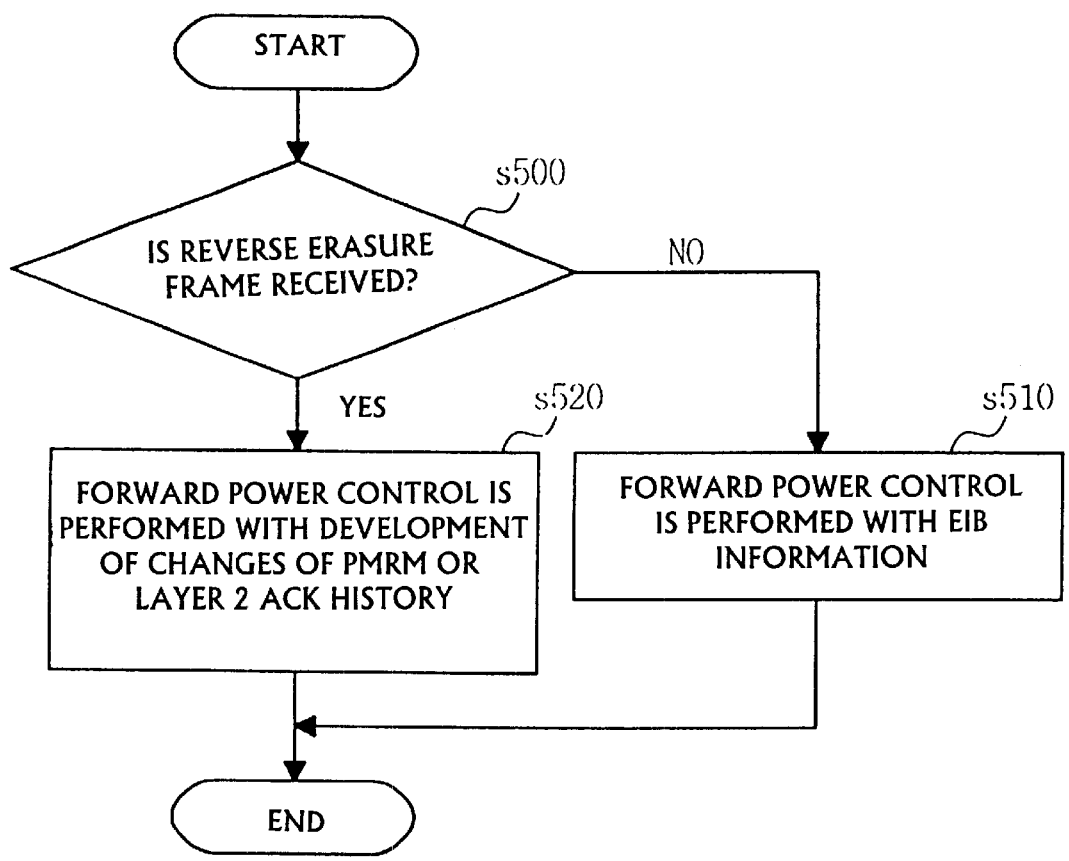
FIG. 5 shows a flow chart illustrating a method for controlling forward power according to the present invention.

FIG. 5 is a flow chart illustrating a method for controlling forward power using the reverse error frame. As illustrated in FIG. 5, the BTS determines whether the reverse erasure frame is received at step 500, and if the reverse erasure frame is not received, i.e., the reverse link status is good, then forward power control is performed using the EIB information received via the reverse link at step 510. Otherwise, when a reverse erasure frame is received, i.e., when the reverse link status is not good, it is impossible to perform forward power control using the EIB information received via the reverse link and the BSC must therefore perform forward power control from changes in the PMRM or Layer 2 ACK history at step 520.

Measuring Forward Link Status Via PMRM and Layer 2 ACK History

It will now be described how to use the PMRM and Layer 2 ACK history.

Figure 6:
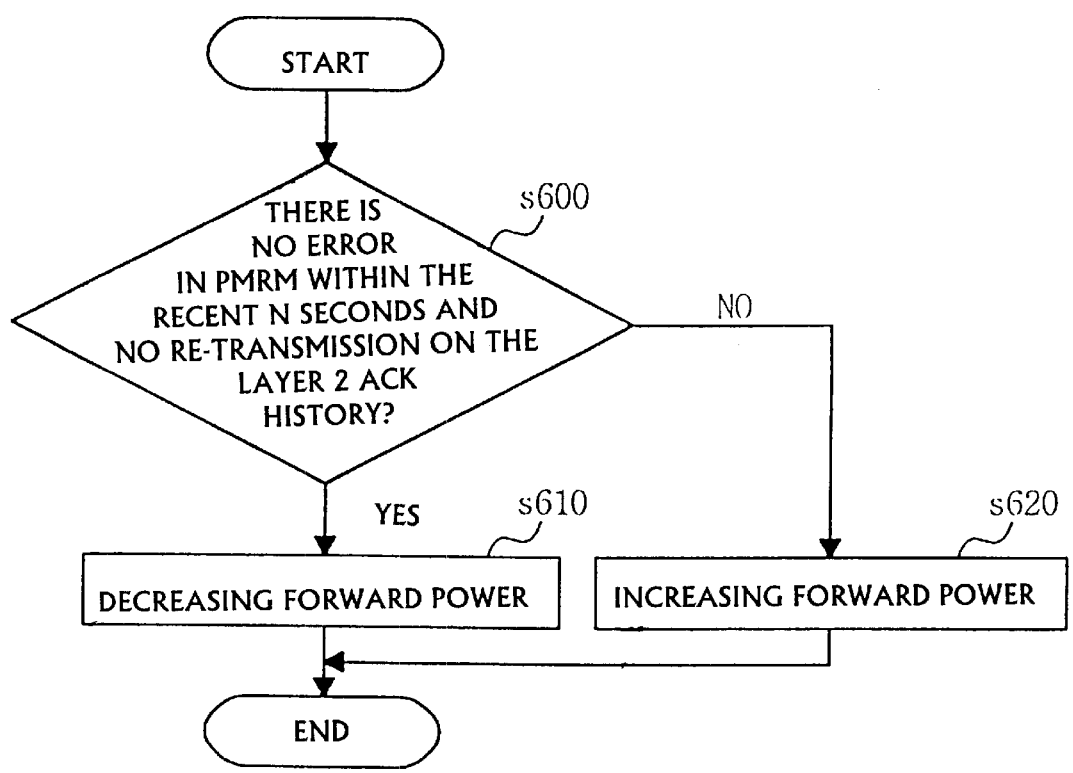
FIG. 6 shows a flow chart illustrating a method for controlling forward power through the development of changes of PMRM or Layer 2 ACK History according to the present invention.

FIG. 6 shows a flow chart illustrating a method for controlling forward power through changes in PMRM or Layer 2 Ack history according to the present invention. As illustrated in FIG. 6, the BSC determines whether there is at least one error in PMRMs received within the most recent N seconds and whether a message has been transmitted on the Layer 2 Ack history, at step 600.

Since the PMRM includes the forward frame error rate, the BSC confirms whether all frame error rates, which are included in those PMRMs received within the most recent N seconds, are less than or equal to a specific threshold. If all frame error rates included in the PMRMs received within the most recent N seconds, are less than or equal to a specific threshold, the BSC determines that no error occurred in the forward link within the recent N seconds.

If there is no error in the PMRMs received within the most recent N seconds and no message has been re-transmitted on the Layer 2 ACK History, the BSC orders the BTS to decrease the forward transmit power at step 610, otherwise, the forward transmit power is increased at step 620.

The power control method performed as stated above can be applied to both a case where the forward link is not good and a case where the reverse link is not good. Because the BTS uses the information previously stored prior to when the forward link or reverse link going bad even though the information received in the BTS is different depending upon whether the forward or reverse link is faulty.

FIG. 7 shows a table illustrating forward link information to be received according to the forward link status and reverse link status.

First, in the case where all of forward and reverse links arc good (i.e., first row), it is possible to obtain all necessary power control information through the forward and reverse links. The situation may occur where an Ack message on Layer 2 is not received, however it does not cause a serious problem because the forward or reverse link status may be determined via the FER on the air-interface even though the ACK message is not received on Layer 2.

Second, in the case where the forward link is initially good and the reverse link is not good (i.e., second row), the BTS will order the mobile station via the forward link to increase the transmit power of the mobile station, in accordance with the reverse erasure frames received by the BTS on the forward link. The reverse link status may also be recovered in a specific time in the normal case.

However, if the forward link status becomes bad before the reverse link status is recovered the BTS cannot send reverse power control information to increase the transmit power of the mobile station. Consequently, the reverse link status cannot be recovered. In this case, like the case above, the strength of the forward transmit power is determined using the pilot strength value of the PMRM message just before receiving reverse erasure information and reverse erasure frame. That is, information of the present forward link status is estimated using the previous information of the forward link status.

Importantly, instead of one-sidedly increasing or decreasing the forward or reverse transmit power strength, it is necessary to calculate a correlation value between the pilot strength and the signal strength for the EIB.

Based on the calculated correlation value, the BSC determines values of the first forward transmit power when a reverse erasure occurs, and continuously increases the value of forward transmit power as the reverse erasure continues. As stated above, the reverse link may be improved if the mobile station normally receives only the power control bit of BTS to improve the reverse link.

Third, in the case where the forward link is not good and reverse link is good (i.e., third row), it is possible to send the forward link status to the BTS via the reverse link, so there is no problem in controlling the forward link power control.

Figure 8:
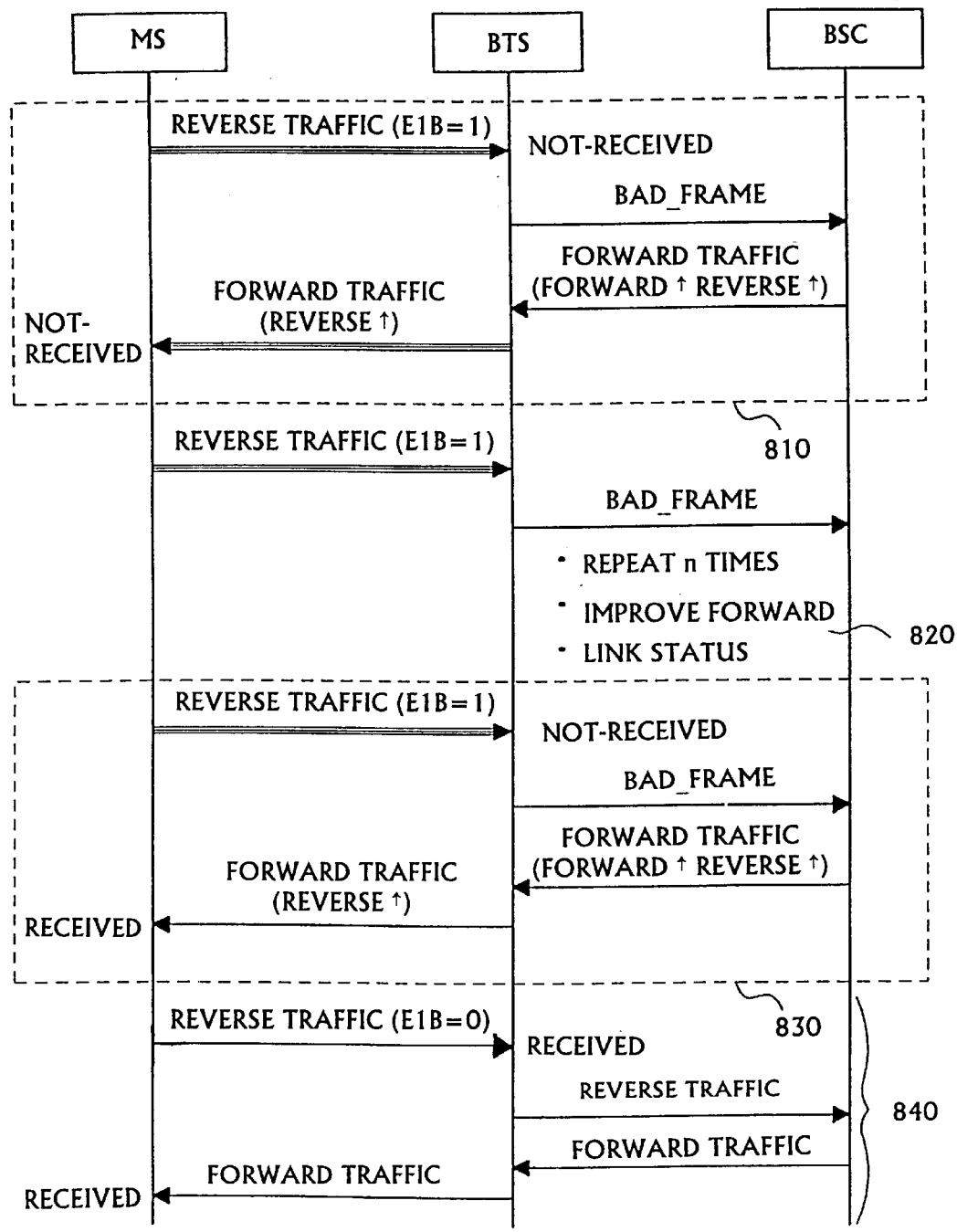
FIG. 8 illustrates a result of method for controlling forward link power independent of reverse link power control according to the present invention in case that all of forward and reverse links are not good.

Referring to FIG. 8, the worst case is when all forward and reverse links become bad simultaneously 810. As illustrated in FIG. 8, the BTS can not obtain forward link status information from the mobile station and the BTS is also unable to send the power control bit of the reverse link to the mobile station. In this case, the call is eventually released.

In step 810, both the reverse traffic frame and forward traffic frame are not received because the reverse link and forward links are degraded wherein the reverse traffic frame includes EIB set to "1" and the forward traffic frame includes an indication to increase the reverse transmit power.

Then, in step 820, the BSC first improves the forward link by referring to the power control information previously received. That is, by increasing the transmit power, the forward link is improved.

Then, in step 830, the forward traffic frame requesting an increase in the reverse transmit power is received in the mobile station via the improved forward link even though the reverse traffic frame is not received.

In step 840, the mobile station increases the reverse transmit power by responding to the forward traffic frame request to increase the reverse transmit power. Therefore, the reverse link is improved. Consequently, both the forward link and reverse link are improved.

As stated above, the present invention makes it possible for the BTS to determine the forward link status utilizing the previous PMRM to improve the forward links status and after that, also improve the reverse link status, in this situation where it is not possible to send the power control bit to the mobile station because the reverse link status is not good.

Additionally, in the above case, it is not possible to know the forward link status because only the erasure frames are received via the reverse link. At this time, the present invention makes it possible to estimate the present status through the just previous PMRM or EIB or Layer 2 ACK History) and determine the transmit power of the BTS according to the estimated values.

Therefore, it comes to be able to perform power control on condition that the forward link is independent to the reverse link. Consequently, the present invention makes it possible to prevent a BTS from excessively transmitting and to prevent the receive sensitivity of mobile station from continuously decrease and not to be influenced by the reverse link status, in a way that the BTS quickly corresponds to the mobile station's demand for power control.

While the invention is susceptible to various modification and alternative forms, specific embodiments thereof have been shown by way of example in the drawings and will be herein be described in detail. It should be understood, however, that it is not intended to limit the invention to the particular forms disclosed, but on the contrary, the intention is to cover all modification, equivalents, and alternatives falling within the spirit and scope of the invention as defined by the appended claims.

What is claimed is:

1. A method for controlling forward link power independent of a current reverse link power control in a mobile communication system when a reverse link status is determined to be bad thereby preventing a forward link status from being sent to a base transceiver station (BTS), said method comprising the steps of:

(a) estimating the forward link status by the BTS using power control information, said power control information being received from a mobile station via said reverse link prior to said reverse link status being determined to be bad;

(b) determining optimal power control information for a specific threshold by repeatedly performing said estimating step of the forward link status;

(c) determining the forward link status to be one of good or bad using said determined optimal power control information;

(d) improving said forward link status by determining a transmit power of said BTS from step (c) when the forward link status is determined to be bad; and (e) improving the reverse link status via said improved forward link.

2. The method as set forth in claim 1, wherein at said estimating step, the BTS estimates said forward link status by determining the strength of the forward transmit power of said BTS, said determination of the strength being based on:

(a) whether reverse eraser frames are continuously received on said reverse link;

(b) whether said BTS continuously re-transmits messages via Layer 2 as a result of not receiving an Acknowledgement (ACK) signal for messages which have been transmitted to said mobile station by said BTS; and (c) a forward frame error rate of zero, said forward frame error rate being included in Pilot Measurement Report Messages (PMRMs) which have been recently received from said mobile station.

3. The method as set forth in claim 2, wherein a decrease in forward transmit power is performed when as a result of said estimating step, there is no error in PMRMs received in the most during recent N second intervals and there is no message re-transmission on the Layer 2 ACK history, otherwise increasing the forward transmit power.

4. The method as set forth in claim 2, wherein the step of determining the strength of the forward transmit power includes:

calculating the pilot strength when an erasure indicator bit (EIB) occurs considering the relation with the pilot strength and the EIB; and determining the transmit value of the initial forward power based on the calculated pilot strength in case of reverse erasure.

5. The method as set forth in claim 4, further including a step of continuously increasing the level of the forward transmit power subsequent to said determining step.

6. The method as set forth in claim 5, wherein said step of improving the reverse link status further comprises the steps of:

(c) normally receiving the power control bit from the BTS via said improved reverse link by said mobile station; and (d) improving the reverse link status using said received power control bit.

7. A method for controlling forward link power independent of reverse link power control when the forward link and reverse link are determined to be faulty, said method comprising the steps of:

(a) improving said forward link status;

(b) sending the reverse power control bit to the reverse link to a mobile station via said improved forward link;

(c) gradually improving the reverse link status by the mobile station using the reverse power control bit of the reverse link, said power control bit being received via said improved forward link;

(d) sending the forward link information to the BTS via said improved reverse link; and (e) controlling the forward link power using the forward link information received via said improved reverse link.

8. A method for controlling forward link power independent of reverse link power control comprising the steps of:

(a) repeatedly measuring the strength of a pilot signal received from a Base Transceiver Station (BTS), and repeatedly reporting said measured strength of pilot signal and forward frame error rate through a Pilot Measurement Report Message (PMRM) on a forward link to said BTS by a mobile station;

(b) determining by the MS whether an acknowledgment message is received from the BTS prior to the expiration of a pre-specified time interval, if acknowledgment for said message is not received from the mobile station until after the expiration of said pre-specified time interval re-transmitting said message to said mobile station on Layer 2;

(c) confirming by mobile station whether an erasure frame occurs on the forward link and transmitting an EIB (Erasure Indicator Bit) via the reverse link to the BTS if the erasure frame occurred on the forward link;

(d) confirming by said BTS whether the erasure frame has occurred on the reverse link after said BTS receives at least one PMRM and said EIB from said mobile station;

(e) based on said confirming step (d), if the erasure frame has occurred on the reverse link, performing power control of forward link by said BTS using PMRMs and ACK history, said PMRMs being those received from said mobile station before said erasure frame has occurred, said ACK history occurring in Layer 2 of said mobile station and said BTS; and (f) based on said confirming step (d), if the erasure frame has not occurred on the reverse link, performing power control of forward link by said BTS using said EIB received from said mobile station.

9. The method as set forth in claim 8, if an erasure frame has occurred on the reverse link based on said confirming step, the step of performing power control of forward link by said BTS further comprises the steps of:

(a) confirming whether the frame error rate above a specific level is not included in PMRMs received within the recent N seconds and whether the BTS has never re-transmitted on the Layer 2 ACK history;

(b) decreasing the transmit power by the BTS, if the frame error rate, which is above the specific level, is not included in PMRMs received within the recent N seconds and the BTS has never re-transmitted on the Layer 2 ACK history; and (c) increasing the transmit power by the BTS, if the frame error rates which is above the specific level, is included in PMRMs received within the recent N seconds and the BTS has ever re-transmitted on the Layer 2 ACK history.

10. The method as set forth in claim 9, wherein if an erasure frame has occurred on the reverse link based on said confirming step, the step of performing power control of forward link by said BTS further comprises the steps of:

(a) determining an initial transmit power of the BTS since the erasure frame has occurred;

(b) waiting the pre-specified time interval after determining the initial transmit power of the BTS;

(c) confirming whether a BAD_FRAME has occurred on the messages received via the reverse link from said mobile station after said pre-specified time interval expires; and (d) increasing said determined initial transmit power of the BTS by a specified amount in the case where a BAD_FRAME occurs on the reverse link even after said effective time runs out.

11. The method as set forth in claim 8, wherein if the erasure frame has not occurred on the reverse link based on step (c), the step of performing power control of forward link further comprises the steps of:

(a) increasing the transmit power by said BTS if EIB has been set to 1, said EIB being received from said mobile station; and (b) decreasing the transmit power by said BTS if EIB has been set to 0.

* * * * *